United States Patent
Freijedo Fernández

(10) Patent No.: US 12,519,320 B2
(45) Date of Patent: Jan. 6, 2026

(54) ACTIVE POWER CONVERSION APPARATUS, SYSTEM, AND METHOD FOR USE IN ACTIVE POWER CONVERSION APPARATUS

(71) Applicant: Huawei Digital Power Technologies Co., Ltd., Shenzhen (CN)

(72) Inventor: Francisco Daniel Freijedo Fernández, Nuremberg (DE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/765,051

(22) Filed: Jul. 5, 2024

(65) Prior Publication Data
US 2024/0364118 A1    Oct. 31, 2024

Related U.S. Application Data

(63) Continuation of application No. PCT/EP2022/050261, filed on Jan. 7, 2022.

(51) Int. Cl.
*H02J 3/50*    (2006.01)
*H02J 3/38*    (2006.01)

(52) U.S. Cl.
CPC ............... *H02J 3/50* (2013.01); *H02J 3/381* (2013.01); *H02J 2300/28* (2020.01)

(58) Field of Classification Search
CPC .......... H02J 3/50; H02J 3/381; H02J 2300/28; H02J 3/241; H02J 3/32; H02J 3/48; Y02E 40/20
See application file for complete search history.

(56) References Cited

U.S. PATENT DOCUMENTS

| | | |
|---|---|---|
| 8,880,236 B2 | 11/2014 | Weiss et al. |
| 9,166,508 B2 | 10/2015 | Cortés et al. |
| 10,389,129 B2 | 8/2019 | Harnefors et al. |
| 2021/0098993 A1 | 4/2021 | Shi et al. |

OTHER PUBLICATIONS

A. A. Nazib, A Self-Synchronizing Stationary Frame Current Control Strategy for Grid-Connected Converters with Integrated Frequency Tracking, 2019, IEEE 10th International Symposium on Power Electronics for Distributed Generation Systems (PEDG) (Year: 2019).*

(Continued)

*Primary Examiner* — Metasebia T Retebo
(74) *Attorney, Agent, or Firm* — Leydig, Voit & Mayer, Ltd.

(57) ABSTRACT

An active power conversion apparatus (APCA) estimates a grid frequency estimation of an electric grid connected to the APCA. The APCA includes a controller for receiving measurements of at least one phase current between the APCA, and the electric grid. The controller converts the at least one phase current to at least one synchronous reference frame, and determines direct and quadrature current references to be used in the grid frequency estimation. The controller determines a use of frequency estimation as a manipulated variable that forces to zero at least one of the average values of current error signals.

20 Claims, 6 Drawing Sheets

(56) References Cited

OTHER PUBLICATIONS

Elutunji Buraimoh, Modeling and Analysis of Standalone Inverter-Based Microgrid with Grid-Supporting Voltage-Source Control under Changing Load, 2020, IEEE PES/IAS PowerAfrica (Year: 2020).*
MANDRILE "Next Generation Inverters Equipped with Virtual Synchronous Compensators for Grid Services and Grid Support," PhD dissertation, Politecnico de Torino, total 191 pages (Jan. 4, 2021).
Nazib et al., "A Self-Synchronising Stationary Frame Current Control Strategy for Grid-Connected Converters with Integrated Frequency Tracking," total 8 pages (Jun. 3, 2019).
Buraimoh et al., "Modeling and Analysis of Standalone Inverter-Based Microgrid with Grid-Supporting Voltage-Source Control under Changing Load," total 5 pages (Aug. 25, 2020).

* cited by examiner

ACTIVE POWER CONVERSION APPARATUS, SYSTEM, AND METHOD FOR USE IN ACTIVE POWER CONVERSION APPARATUS

CROSS-REFERENCE OF RELATED APPLICATIONS

This application is a continuation of International Application No. PCT/EP2022/050261, filed on Jan. 7, 2022, the disclosure of which is hereby incorporated by reference in its entirety.

FIELD

The present disclosure relates generally to the field of power electronics units and to an active power conversion apparatus (APCA), a system comprising the APCA, and a method for use in the APCA.

BACKGROUND

Generally, in the present scenarios of current "green energy" paradigms, electric grids are experiencing big changes. More specifically, a conventional electric grid is increasingly feed by decarbonised sources of energy, which involves a rising number of power electronics-based technologies, such as solar photovoltaic (PV) inverters. On the contrary, traditional power systems (or stations) are usually interfacing the electric grid with bulky synchronous generators tend to be closed. Moreover, from a power system perspective, the substitution of "rotating" synchronous machines by "static" power electronics creates several operability challenges. One of which is reducing the overall inertia of the power system, which is strongly associated with the mechanical kinetic energy stored in a rotor of the synchronous machines. Conventionally, the synchronous machine acts as an aid to maintaining system frequency stability by its natural (i.e., unforced) response in the presence of frequency shift events. However, removing the synchronous machines have an unforced corrective measure for frequency stability, which is not desirable.

Conventionally, the availability of energy storage systems in combination with renewable energy resources is used to provide an inertia effect for frequency control. In an example, the renewable energy resource interfacing a grid with the power electronics can be equipped with energy storage devices in order to contribute inertia to the conventional power system. When looking at the classical solution based on the synchronous machines, it is a natural response. However, this is not the case of static power converters, due to which such a solution has to be implemented in the control of the power converter that interfaces renewable energy and storage resources. Aside from defining a rule for the grid-frequency and active power request, the main challenge for implementing a frequency control method comes from the difficulty to get an accurate and clean estimation of the grid-frequency from the voltage and currents real-time measurements.

Currently, certain attempts have been made to get an accurate and clean estimation of the grid frequency, such as by using digital signal processing, which is based on a phase-locked loop (PLL) algorithm via the voltage at the point of connection as input. However, such attempts are not desirable to provide grid-frequency control services associated with the weak grid voltage measurement feeding.

Therefore, there exists a technical problem of how to provide the provide grid-frequency control services in the power electronics.

Therefore, in light of the foregoing discussion, there exists a need to overcome the aforementioned draw backs associated with the conventional power electronics.

SUMMARY

The present disclosure provides an active power conversion apparatus (APCA). The present disclosure further provides a system comprising the APCA. The present disclosure further provides a method for use in the APCA. The present disclosure provides a solution to the existing problem of how to provide the provide grid-frequency control services in the power electronics. The present disclosure provides solutions that overcomes problems encountered in the prior art and provides an improved active power conversion apparatus (APCA), an improved system comprising the APCA, and an improved method for use in the APCA. For example, a method for providing frequency control services in power electronics units that are equipped with energy storage.

In one aspect, the present disclosure provides an active power conversion apparatus (APCA), configured to estimate the grid frequency estimation of an electric grid connected to the APCA. The APCA includes a controller configured to receive measurements of at least one phase current between the APCA and the electric grid, convert the at least one phase current to at least one synchronous reference frame, determine direct and quadrature current references to be used in the frequency estimation, and determine the use frequency estimation as a manipulated variable that forces to zero at least one of the average values of current error signals.

The APCA is configured to estimate the grid frequency estimation of the electric grid that is connected to the APCA. Then, from the grid frequency estimation, an amount of active power delivered to the electric grid is adjusted according the grid-frequency control rule (e.g., droop function or look-up table). In other words, the APCA further provides frequency control services in the electric grid (or power electronics unit) that is equipped with the energy storage resource. Moreover, the controller of the APCA works with an increased bandwidth, which assures a perfect tracking for frequency control services in the electric grid. Beneficially, as compared to conventional approach, the controller can determine the grid frequency estimation as the manipulated variable that forces to zero at least one of the average values of current error signals. In other words, under certain assumptions, the controller can calculate the zero-error state error achieved by the current control.

In a further implementation form, the controller is further configured to convert the at least one phase current to at least one synchronous reference frame based on a park transform driven by an angle obtained by integration of the grid frequency estimation.

The park function is beneficial to rotate the at least one synchronous reference frame at the angle.

In a further implementation form, the controller is further configured to bound the second state variable to avoid division by zero problems.

The second state variable employed in the division can be bounded in a range of values that avoids zero, such as to avoid the division by zero problems.

In a further implementation form, the relation between injected power from the energy storage device and estimated frequency is based on a linear function.

A system comprising the APCA of any preceding claim and a current control (CC) block, wherein the CC block includes a pulse width modulation (PWM) block and wherein the CC block is configured to set references for the PWM block as a function of current references; AC currents measurements and the phase-angle obtained by integration of the estimated frequency.

The system achieves all the advantages and technical effects of the active power conversion apparatus (APCA) of the present disclosure.

A method for use in an active power conversion apparatus (APCA) configured to estimate the grid frequency estimation of an electric grid connected to the APCA the method includes receiving measurements of at least one phase current between the APCA and the electric grid, converting the at least one phase current to at least one synchronous reference frame, determining direct and quadrature current references to be used in the frequency estimation, and determining the use frequency estimation as a manipulated variable that forces to zero at least one of the average values of current error signals.

The method achieves all the advantages and technical effects of the active power conversion apparatus (APCA) of the present disclosure.

It is to be appreciated that all the aforementioned implementation forms can be combined.

It should be noted that all devices, elements, circuitry, units, and means described in the present disclosure could be implemented in the hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity, which performs that specific step or functionality, it should be clear for a skilled person that these methods and functionalities can be implemented in respective hardware elements, or any kind of combination thereof. It will be appreciated that features of the present disclosure are susceptible to being combined in various combinations without departing from the scope of the present disclosure.

Additional aspects, advantages, features, and objects of the present disclosure would be made apparent from the drawings and the detailed description of the illustrative implementations below.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
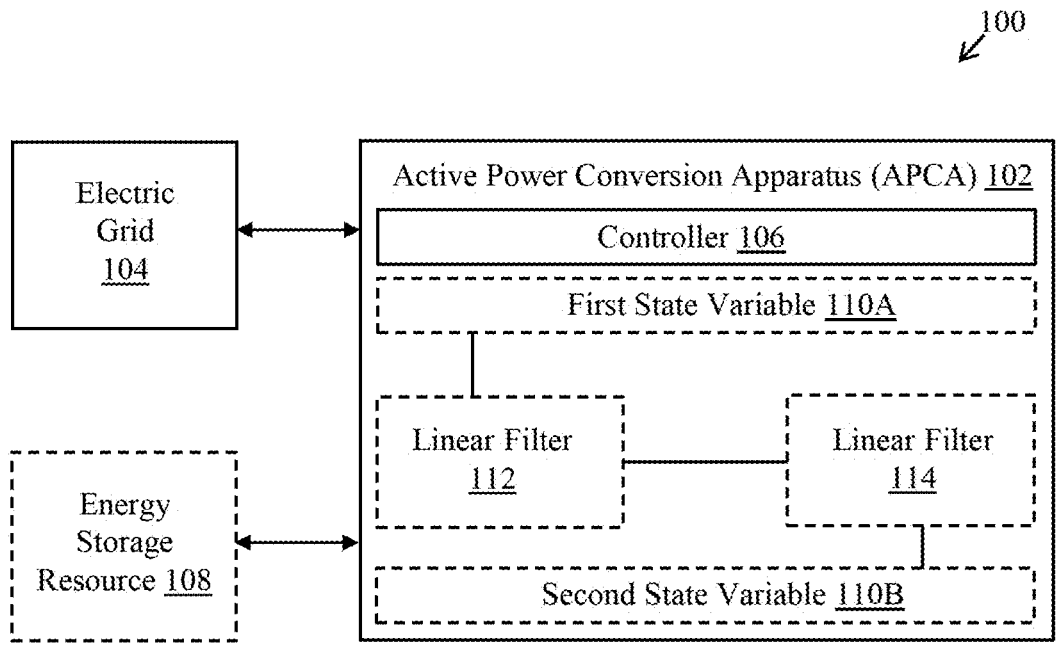
FIG. 1 is a block diagram that includes an active power conversion apparatus (APCA), in accordance with an embodiment of the present disclosure.

FIG. 1 is a block diagram that includes an APCA, in accordance with an embodiment of the present disclosure. With reference to FIG. 1, there is shown a block diagram 100 that includes an APCA 102, an electric grid 104, and a controller 106. There is further shown an energy storage resource 108, a first state variable 110A, a second state variable 110B, and linear filters 112 and 114.

The APCA 102 is configured to estimate the grid frequency estimation of the electric grid 104 connected to the APCA 102. The APCA 102 is used to provide grid-frequency control services.

The electric grid 104 is an electrical power system network that includes a power generating plant, transmission lines, a substation, transformers, distribution lines, and the like. In other words, the electric grid 104 is used to provide electricity all the way from its generation to customers that use it for their daily needs.

The controller 106 may include suitable logic, circuitry, interfaces, and/or code that are configured to receive measurements of at least one phase current between the APCA 102 and the electric grid 104. Examples of implementation of the controller 106 may include but are not limited to a central data processing device, a microprocessor, a microcontroller, a complex instruction set computing (CISC) processor, an application-specific integrated circuit (ASIC) processor, a reduced instruction set (RISC) processor, a very long instruction word (VLIW) processor, a state machine, and other processors or control circuitry. In an implementation, the controller 106 is attached in parallel to a control a CC block and a PWM block (i.e., CC+PWM).

The energy storage resource 108 may also be referred to as an energy storage device. In an implementation, the energy storage resource 108 corresponds to a battery. In an implementation, the storage power of the energy storage resource 108 ($p_{sr}(t)$) is 400 killo watt (KW). In an example, the energy storage resource 108 is connected to a renewable energy resource, such as wind or solar photovoltaic (PV), with a generation power ($p_{re}(t)$) of two Mega Watt (MW) nominal value.

The first state variable 110A and the second state variable 110B are two different variable elements. In an example, the first state variable 110A, and the second state variable 110B are used in a reframing synchronous reference frame system. In another example, the first state variable 110A is represented as $i_d$, and the second state variable 110B is represented as $i_q$.

The linear filters 112 and 114 may include suitable logic, circuitry, interfaces, and/or code that are configured to perform a filter operation. In an implementation, the linear filter 112 is configured to be applied to the first state variable 110A of the APCA 102 and the linear filter 114 is configured to be applied to the output of the linear filter 112 and the second state variable 110B. In an implementation, each filter corresponds to a low pass linear filter, a parallel combination of an inductor (L), and a capacitor (C). In other words, the linear filter 112 corresponds to a LC parallel circuit, and also the linear filter 114 also corresponds to another LC parallel circuit.

In operation, the controller 106 is configured to receive measurements of at least one phase current between the APCA 102 and the electric grid 104. The controller 106 is further configured to convert the at least one phase current to at least one synchronous reference frame. The controller 106 is further configured to determine direct and quadrature current references to be used in the grid frequency estimation. The controller 106 is further configured to determine the grid frequency estimation as a manipulated variable that forces to zero at least one of the average values of current error signals. Firstly, the controller 106 is configured to receive measurements of at least one phase current between the APCA 102 and the electric grid 104. For example, the controller 106 is configured to receive the at least one phase current from actual Alternating Current (AC or ac) currents [$i_a$ $i_b$ $i_c$], where [$i_a$ $i_b$ $i_c$] represents three-phase current values. The controller 106 is further configured to convert the at least one phase current to at least one synchronous reference frame. In an implementation, a RCSRF along with the control the current control block and the pulse width modulation block are used by the controller 106 to convert the at least one phase current to the at least one synchronous reference frame, as further shown and described in FIG. 2. Thereafter, the controller 106 of the APCA 102 is configured to convert the at least one phase current to the at least one synchronous reference frame. In an example, the controller 106 is configured to convert the $i_a$ into the at least one synchronous reference frame. In another example, the controller 106 is configured to convert the $i_b$ into the at least one synchronous reference frame. In yet another example, the controller 106 is configured to convert the $i_c$ into the at least one synchronous reference frame, as further shown and described in FIG. 2.

The controller 106 is further configured to determine the direct and the quadrature current references that are two linearly independent vectors in a plane (i.e., two fully decoupled variables). In an example, the direct current and the quadrature current references are represented as [$I^*_d$ $I^*_q$]. Moreover, the controller 106 is configured to perform vector current control (dq-frame current control) operation, such as through a grid-interface of power electronics conversion systems (PECS2) to determine the direct and the quadrature current references. Thereafter, the direct and the quadrature current references are used by the controller 106 of the APCA 102 to determine the grid frequency estimation of the electric grid 104. In an implementation, the grid frequency estimation is represented as $\hat{\omega}_g$. Moreover, the grid frequency estimation is determined from the manipulated variable that forces to zero at least one of the average values of current error signals, as further shown and described in FIG. 4.

In an implementation, the controller 106 is configured to determine the grid frequency estimation by forcing the at least one of the average values of current error signals to zero. In an example, the at least one of the average values of current error signals corresponds to a dc-error of the dq-frame actual currents values (i.e., the reframing). As a result, whenever the steady-state is achieved, the controller 106 tracks the electric grid 104 and also handles the APCA 102 that perfectly decouples the active/reactive currents directions of the electric grid 104, such as through the direct current and the quadrature current references. Beneficially as compared to the conventional approach, the controller 106 is configured to first determine the grid frequency estimation, and then set power references of the energy storage resource 108 as a function of this estimated value, accordingly. Moreover, the controller 106 is beneficial to determine an accurate and smooth grid frequency estimation.

In accordance with an embodiment, the controller 106 is further configured to determine the at least one synchronous reference frame based on the direct current references. In other words, the at least one synchronous reference frame is determined based on the direct current references only (i.e., [$I^*_d$]). In an example, the at least one synchronous reference frame is determined by dividing the at least one phase current by the direct current references.

In accordance with an embodiment, the controller 106 is further configured to determine the at least one synchronous reference frame based on the quadrature current references. In other words, the at least one synchronous reference frame is determined based on the quadrature current references only (i.e., [$I^*_q$]). In an example, the at least one synchronous reference frame is determined by dividing the at least one phase current by the direct current references.

In accordance with an embodiment, the controller 106 is further configured to determine the direct and/or quadrature current references based on current error signals which are determined by subtracting the measurements of at least one phase current from the direct and quadrature current references. In an implementation, at least one phase current (i.e., $i_a$ or $i_b$ or $i_c$) is subtracted from the direct and quadrature current references. After that, the error values (e.g., $\Delta i_g$) are determined from the subtraction. In an example, the current error signals are further passed through a filter. In an implementation, the controller 106 is further configured to determine the direct current reference based on the current error signals. In another implementation, the controller 106 is further configured to determine the quadrature current reference based on the current error signals. In yet another implementation, the controller 106 is configured to determine the direct and quadrature current reference based on the current error signals, as further shown and described in FIG. 4.

In accordance with an embodiment, the controller 106 is further configured to convert the at least one phase current to at least one synchronous reference frame based on a park transform driven by an angle obtained by integration of the grid frequency estimation. In an implementation, the estimated grid frequency is integrated, such as through an integrator, whose output is resulted in the form of the angle (e.g., $\hat{\theta}_g$). The angle is further used to drive the park transform. In an example, the park transform is used to convert two components in a αβ frame to an orthogonal rotating reference frame. Therefore, the park transform is used by controller 106 to convert the at least one phase current to the at least one synchronous reference frame, such as through RCSRF. The park transform is beneficial to rotate the at least one synchronous reference frame at the angle.

In accordance with an embodiment, the controller 106 is further configured to drive the active power injection from at least one available energy storage resource 108 to the electric grid 104 based on the grid frequency estimation. In an implementation, the grid frequency estimation is employed to drive a PIFC and eventually provide the active power injection that goes in or out of the energy storage resource 108 to the electric grid 104. In an example, the active power injection of the energy storage resource 108 is represented as $p_{st}(t)$.

In accordance with an embodiment, the APCA 102 further includes the linear filter 112 that is configured to be applied to the first state variable 110A of the APCA 102. The APCA 102 further includes the linear filter 114 that is configured to be applied to the output of the linear filter 112 and the second state variable 110B that represents the direct current measurement or reference. In an implementation, the linear filter 112 and the linear filter 114 works in a frequency domain. In an example, the value of the linear filter 112 can be equal to one, and the linear filter 114 can act as the main controller. In another implementation, the first state variable 110A corresponds to a current value, such as $I^{*(F)}_q$, and the second state variable 110B also corresponds to a current value, such as $I^{*(F,B)}_d$. In an example, subscript 'd' corresponds to direct current reference, and subscript 'q' corresponds to quadrature current reference. In addition, superscript 'F' means that the first state variable 110A (or input variable) can be pre-filtered with the linear filter 112, before entering a loop, and superscript 'B' means that the second state variable 110B employed in a division can be bounded in a range of values that avoids zero, such as to avoid division by zero problems. Moreover, the linear filter 114 that is applied to the output of the linear filter 112 and the second state variable 110B that represents the direct current measurement (or reference), as further shown as described in FIG. 4.

In accordance with an embodiment, the controller 106 is further configured to bound the second state variable 110B to avoid division by zero problems. In other words, the second state variable 110B employed in the division can be bounded in a range of values that avoids zero, such as to avoid the division by zero problems.

In accordance with an embodiment, the relation between injected power from the energy storage resource 108 and estimated frequency is based on a linear function. In an implementation, the injected power from the energy storage resource 108 aims to mitigate deviations of the grid frequency estimation. Moreover, the controller 106 is configured to store the relation between the injected power from the energy storage resource 108 and the estimated frequency based on the linear function, such as $\hat{\omega}_g(t)$ versus $p_{st}(t)$ function. The controller 106 is further configured to take into account maximum frequency deviations and maximum available power to provide a service.

In accordance with an embodiment, the linear function is a droop function. In other words, the linear function, such as $\hat{\omega}_g(t)$ versus $p_{st}(t)$ function between injected power from the energy storage resource 108 and estimated frequency is the droop function (or a linear droop function), as further shown and described in FIG. 5A. In an example, the droop function may also be referred to as the frequency-power function, and other more elaborated relations can be elaborated without compromising the basic functionality of the present disclosure. In addition, once the basic functionality is defined, the controller 106 is configured to accurately determine the grid frequency estimation using the electric measurements available at the energy storage resource 108 (or inverter terminals).

The APCA 102 is configured to estimate the grid frequency estimation of the electric grid 104 that is connected to the APCA 102. In other words, the APCA 102 provides frequency control services in the electric grid 104 (or power electronics unit) that is equipped with the energy storage resource 108. Moreover, the controller 106 of the APCA 102 works with an increased bandwidth, which assures a perfect tracking for frequency control services in the electric grid 104. Beneficially, as compared to conventional approach, the controller 106 can determine the grid frequency estimation as the manipulated variable that forces to zero at least one of the average values of current error signals. In other words, the under perfect tracking assumption, the controller 106 can calculate the zero-error state error achieved by the current control.

Figure 2:
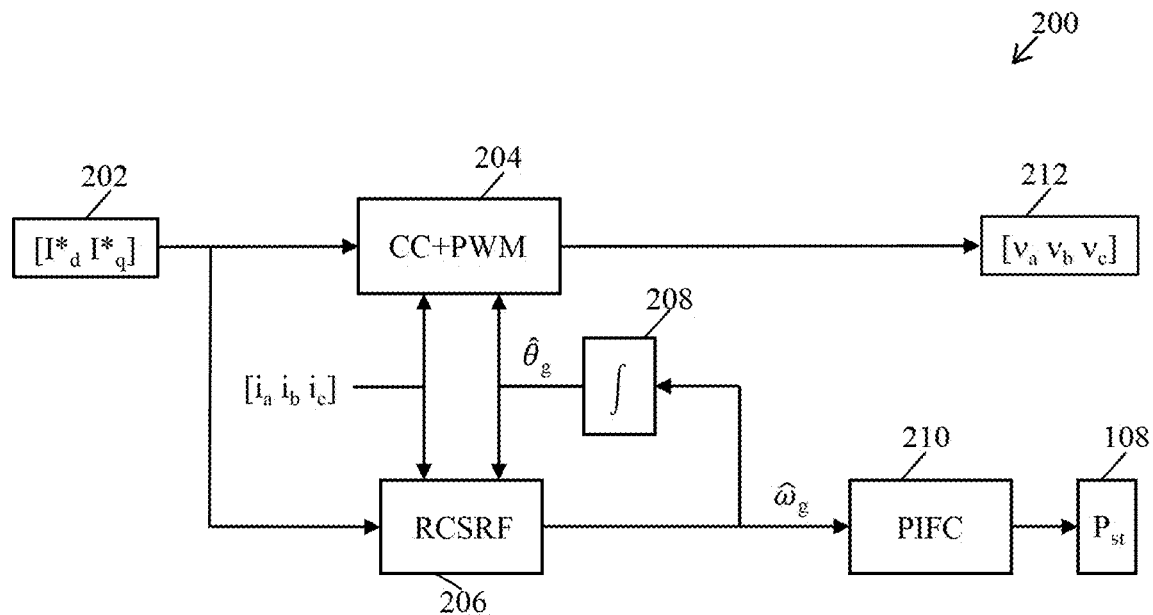
FIG. 2 is a controller diagram of an APCA, in accordance with an embodiment of the present disclosure.

FIG. 2 is a controller diagram of an APCA, in accordance with an embodiment of the present disclosure. FIG. 2 is described in conjunction with elements from FIG. 1. With reference to FIG. 2, there is shown a circuit diagram of an APCA 200 that includes an input block 202, a CC and PWM 204, a RCSRF block 206, an integrator 208, a PIFC block 210, an output inverter voltage block 212, and the energy storage resource 108.

The APCA 200 corresponds to the APCA 102 of FIG. 1. The input block 202 may include suitable logic, circuitry, interfaces, and/or code that are configured to provide current references, such as direct and quadrature current references (i.e., $[I^*_d\ I^*_q]$), which are further used in the frequency estimation. In an example, the current references are produced from one or more outer loops.

The current control and pulse width modulation block 204 collectively referred to the controller 106 of FIG. 1. The RCSRF block 206 may include suitable logic, circuitry, interfaces, and/or code that are configured to convert the at least one phase current to at least one synchronous reference frame.

The integrator 208 may include suitable logic and circuitry that are configured to integrate the estimated grid frequency. The PIFC block 210 is driven by the grid-frequency estimation $\hat{\omega}_g$ and eventually provide the power that goes in or out of the energy storage resource 108. The output inverter voltage block 212 is configured to produce an output inverter voltage, such as $\vec{v}=[v_a \; v_b \; v_c]$.

In an implementation, the input block 202 is configured to provide the current references $[I^*_d \; I^*_q]$. The current references $[I^*_d \; I^*_q]$ along with actual currents in dq-frame $[i_d \; i_q]$ acts as inputs of the RCSRF block 206. In an example, the RCSRF block 206 further receives the actual ac currents $[i_a \; i_b \; i_c]$. Thereafter, the RCSRF block 206 is configured to determine the grid-frequency estimation $\hat{\omega}_g$. The grid-frequency estimation $\hat{\omega}_g$ is further sent to the integrator 208, and the PIFC block 210. The integrator 208 is configured to integrate the grid-frequency estimation $\hat{\omega}_g$ and also to provide an angle (or phase angle), which is further used to drive the park transform. Thereafter, the current control and pulse width modulation block 204 is configured to receive the current references $[I^*_d \; I^*_q]$, the actual ac currents $[i_a \; i_b \; i_c]$, and the output of the integrator 208 (i.e., $\hat{\theta}_g$). In other words, from $\vec{i}=[i_a \; i_b \; i_c]$ and $\hat{\theta}_g$, the dq-frame actual currents $[i_d \; i_q]$ are calculated and then employed in the current control block (or closed-loop dq-frame current control). After that, the current control and pulse width modulation block 204 is configured to calculate PWM references and eventually set the output inverter voltage $\vec{v}=[v_a \; v_b \; v_c]$ of the output inverter voltage block 212. In addition, the grid-frequency estimation $\hat{\omega}_g$ is also employed to drive the PIFC block 210, which further provides the power that goes in or out of the energy storage resource 108. In an example, storage power of the energy storage resource 108 is represented as $p_{st}(t)$. In another example, the storage power of the energy storage resource 108 is around 400 kW. However, the energy storage resource 108 can have other possible values of the storage power, without limiting the scope of the present disclosure.

In another implementation, the RCSRF block 206 is configured to determine the grid-frequency estimation $\hat{\omega}_g$, rationale and details of the RCSRF block 206 are described below:

Firstly, current equations on a positive-sequence dq-frame (or synchronous reference frame) are defined by the real grid frequency are shown by equations (1a) and (1b):

$$si_d = -\omega_g i_q + u_d/L_d - e_d/L_d \quad (1a)$$

$$si_q = \omega_g i_d + u_q/L_q - e_q/L_q \quad (1b)$$

with $L_d$ and $L_q$ corresponds to equivalent inductors, that is obtained from the assumption that $Z_{cs}(\omega)$ and $Z_g(\omega)$ are pure inductive and $Z_{cp}(\omega) \approx 0$ at 50/60 Hertz (Hz).

The rest of the variables are the ones with dq-indexes referring to the dq-frame operation. In an example, DC variables are used in two decoupled systems (d and q) that ease control implementations and theoretical analysis (e.g., largely used in grid and electrical machines). Thereafter, the grid voltage is aligned with d-axis (i.e., $e_q=0$), so as to choose the synchronous reference frame. As a result, the current control and pulse width modulation block 204 works with a large bandwidth, which assures perfect tracking. Under perfect tracking assumption, the current control and pulse width modulation block 204 further determine the use of frequency estimation as a manipulated variable that forces to zero at least one of the average values of current error signals. In other words, the current control and pulse width modulation block 204 is configured to calculate a zero-error state, such as by calculation of operation points of the current control and pulse width modulation block 204 by making d/dt terms=0. In an example, the zero-error state is achieved by the current control and pulse width modulation block 204 by setting a value of s=0 for equation (1a), and (1b), which results as:

$$\omega_g I_q = U_d/L_d - E_d/L_d \quad (2a)$$

$$\omega_g I_d = U_q/L_q \quad (2b)$$

The equation (2a) is obtained from the equation (1a), and the equation (2b) is obtained from the equation (1b) because $e_q=0$. Moreover, uppercase variables are used to represent dc-values or steady-state solutions. In an example, for the steady-state operation point achieved in (2), the equations (1a), and (1b) can be rewritten as:

$$si_d = -\omega_g i_q + \omega_g I_q \quad (3a)$$

$$si_q = \omega_g i_d + \omega_g I_d \quad (3b)$$

The equation (3a) is obtained from the equation (1a), and the equation (3b) is obtained from the equation (1b). Then, the synchronous reference frame frequency is now changed to the reference frame defined by the estimated frequency $\hat{\omega}_g$ by the substitution $s \to s+j(\omega_g-\hat{\omega}_g)$, as shown below:

$$si_d = -\hat{\omega}_g i_q + \omega_d I_q \quad (4a)$$

$$si_q = \hat{\omega}_g i_d + \omega_g I_d \quad (4b)$$

The equation (4a) is obtained from the equation (3a), and the equation (4b) is obtained from the equation (3b). The equation (4a), and the equation (4b) are the basic equations used by the RCSRF block 206. After that, the estimated variable @g is modified until it matches the real variable $\omega_g$. To do so, the next step is to perform small-signal analysis around the operation points, such that $\omega_g=\Omega_n+\Delta\omega_g$, $\hat{\omega}_g=\Omega_n+\Delta\hat{\omega}_g$, $i_d=I_d+\Delta I_d$ and $i_q=I_q+\Delta I_q$, so $$s\Delta i_d = -\Omega_n \Delta i_q - I_q \Delta\hat{\omega}_g + I_q \Delta\omega_g \quad (5a)$$

$$s\Delta i_q = \Omega_n \Delta i_d + I_d \Delta\hat{\omega}_g - I_d \Delta\omega_g \quad (5b)$$

The equation (5a) is obtained from the equation (4a), and the equation (5b) is obtained from the equation (4b), with $\Omega_n=2\pi 50$ rad/s, which is a central value for a nominal angular grid frequency (50 Hz grid). Moreover, in a vector state space mode, the equations (5a), and (5b) are combined and written as:

$$s\begin{bmatrix}\Delta i_d \\ \Delta i_q\end{bmatrix} = \begin{bmatrix}0 & -\Omega_n \\ \Omega_n & 0\end{bmatrix}\begin{bmatrix}\Delta i_d \\ \Delta i_q\end{bmatrix} - \begin{bmatrix}I_q \\ -I_d\end{bmatrix}\Delta\hat{\omega}_g + \begin{bmatrix}I_q \\ -I_d\end{bmatrix}\Delta\omega_g \quad (6)$$

Figure 4:
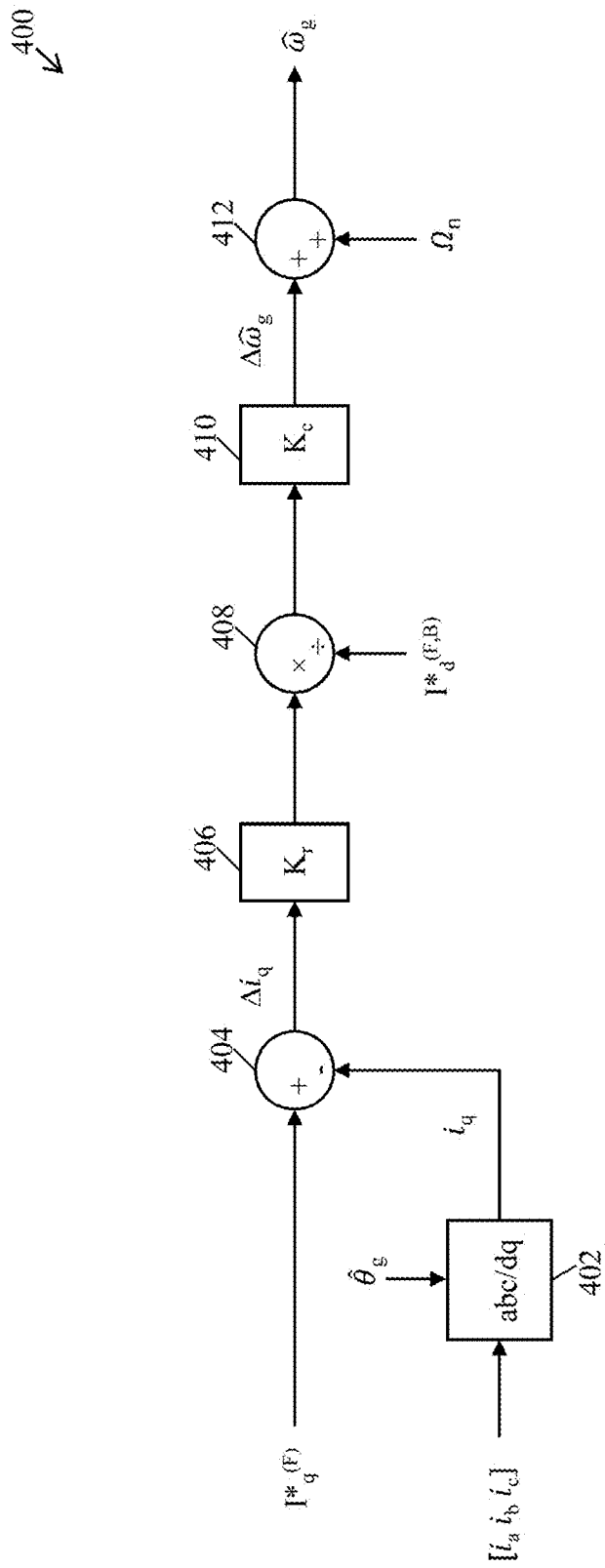
FIG. 4 is a controller diagram that depicts by an APCA for grid frequency estimation, in accordance with an embodiment of the present disclosure.

From equation (6) it is clearly visible that, the reframing synchronous reference frame system uses $\Delta i_d$ and $\Delta i_q$ as state variables, $I_d$ and $I_q$ as constant values depending on the operation point [in fact $I^*_d, I^*_q$ can be replace $I_d, I_q$ in (6)], $\Delta\hat{\omega}_g$ as the manipulated variable and $\Delta\omega_g$ the unknown variable to be estimated (or disturbance). FIG. 4 shows an embodiment for the frequency estimator according to the model explained.

Figure 3:
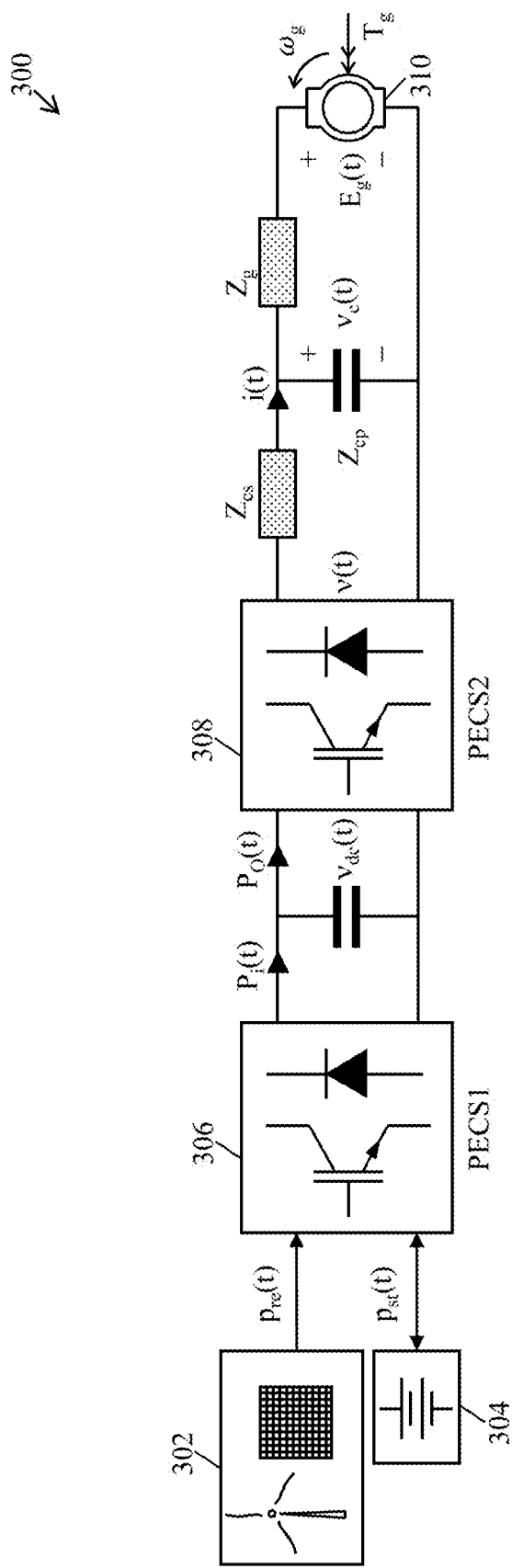
FIG. 3 is a circuit diagram of an APCA, in accordance with an embodiment of the present disclosure.

FIG. 3 is a circuit diagram of an APCA, in accordance with an embodiment of the present disclosure. FIG. 3 is described in conjunction with elements from FIGS. 1, and 2. With reference to FIG. 3, there is shown a circuit diagram of an APCA 300. The APCA 300 includes a renewable energy resource 302, an energy storage resource 304, a first power electronics conversion system (PECS1) 306, a second PECS2 308, and an electric machine 310.

The APCA 300 corresponds to the APCA 102 of FIG. 1 (or the APCA 200 of FIG. 2). The APCA is configured to integrate the renewable energy resource 302 into the electric grid 104 with the provision of frequency control services by the energy storage resource 304.

The renewable energy resource 302 corresponds to an energy source that is configured to produce electric energy. In an example, the renewable energy resource 302 corresponds to a wind energy source, or a solar photovoltaic (PV) inverter.

The energy storage resource 304 corresponds to the energy storage resource 108 of FIG. 1. In an example, the energy storage resource 304 may corresponds to a battery.

The first power electronics conversion system 306, and the second power electronics conversion system 308 are configured to convert power received from the renewable energy resource 302 or the energy storage resource 304 into an intermediate dc-bus. In an example, each power electronics conversion system includes a combination of passive and active switches, however, another possible combination is also possible without limiting the scope of the present disclosure. The electric machine 310 depicts an oversimplified model of a power system. Examples of the electric machine 310 include, but are not limited to a motor, and the like.

In an implementation, the renewable energy resource 302 is configured to produce unidirectional instantaneous power $p_{re}(t)$, and the energy storage resource 304 is configured to produce bi-directional instantaneous power $p_{st}(t)$. The output of the renewable energy resource 302 and the energy storage resource 304 are further connected to the first power electronics conversion system 306, which is configured to produce an instantaneous power $p_i(t)$ coming into a DC-link. There is further shown in FIG. 3 that there exists a dc-link capacitor arranged parallelly between the first power electronics conversion system 306, and the second power electronics conversion system 308. Moreover, dc-link voltage $v_{dc}(t)$ also exits across the dc-link capacitor. As a result, an instantaneous power $p_o(t)$ exits at an input point of the second power electronics conversion system 308, which is coming from the dc-link to the ac grid. After that the second power electronics conversion system 308 converts power from the intermediate dc-link (or dc-bus) into an ac grid. Thereafter, the output of the second power electronics conversion system 308 is filtered through an LC parallel filter. However, other possible configurations like L, LCL, and the like can be used without limiting the scope of the present disclosure. In an example, grid-mode is represented by a machine equivalent, formed by a series impedance and the rotating electrical machine. In an example, $\vec{v}(t)$ is an output ac voltage vector, which corresponds to a manipulated variable of a current-controlled inverter, and $\vec{i}(t)$ is an output ac current vector, in the time domain.

There is further shown that an LC inverter output filter is arranged at the output of the second power electronics conversion system 308, and it can be seen as that $\vec{v}_C(t)$ is voltage across the capacitor along with an impedance $Z_{cp}$ ($\omega$). In an example, $Z_{cp}(\omega)$ is the impedance of the power system model. It can be assumed capacitive or, for a 50 Hz main component, an open circuit (i.e., negligible). There is further shown an impedance $Z_g(\omega)$ of the power system, which is defined in the frequency domain. In an example, such impedance of the power system can be assumed inductive-resistive in all the spectrum. There is further shown series impedance $Z_{cs}(\omega)$ at the ac converter output. In an example, such series impedance can be assumed inductive-resistive in all the spectrum. There is further shown the electric machine 310 that depicts an oversimplified model of a power system. Moreover, the electric machine 310 that is arranged at the output of the LC inverter output filter. In an example, $\vec{e}_g(t)$ represents the internal voltage of the electric machine equivalent, and $\omega_g(t)$ corresponds to the rotation of the power system.

FIG. 4 is a controller diagram that depicts an APCA for grid frequency estimation, in accordance with an embodiment of the present disclosure. FIG. 4 is described in conjunction with elements from FIGS. 1, 2, and 3. With reference to FIG. 4, there is shown a circuit diagram that depicts an APCA 400 for grid frequency estimation. The APCA 400 includes a first logic circuit 402, a second logic circuit 404, a linear filter 406, a third logic circuit 408, a linear filter 410, and a fourth third logic circuit 412.

In an implementation, an active power provided by the second power electronics conversion system 308 is bigger than a minimum threshold. Moreover, the first logic circuit 402 is configured to receive measurements of the at least one phase current (i.e., $i_a$ or $i_b$ or $i_c$). Thereafter, the at least one phase current is further divided by dq-frame values. The first logic circuit 402 is further configured to convert the at least one phase current to at least one synchronous reference frame based on a park transform driven by an angle ($\hat{\theta}_g$). Obtained by integration of the grid frequency estimation. After that the second logic circuit 404 is configured to receive the first state variable 110A (i.e., a current value, such as $I^{*(F)}_q$), and at least one phase current quadrature current references. Moreover, the second logic circuit 404 is further configured to determine the direct and/or quadrature current references based on current error signals which are determined by subtracting the measurements of at least one phase current from the direct or quadrature current references. After that the error values (e.g., $\Delta i_g$) are determined from the subtraction, and the error values (e.g., $\Delta i_g$) are applied to the linear filter 406. In an example, the linear filter 406 is represented as Kr. In an implementation, the linear filter 406 is applied to the first state variable 110A of the APCA 102.

There is further shown that the output of the linear filter 406 is further received by the third logic circuit 408. The third logic circuit 408 further receives the second state variable 110B (or a current value, such as $I^{*(F,B)}_d$. After that the output of the third logic circuit 408 is applied to the linear filter 410. In an implementation, output of the linear filter 406 is further applied to the output of the linear filter 410, and the second state variable 110B represents the direct current measurement or reference. The linear filter 410 further produces $\Delta\hat{\omega}_g$ as a manipulated variable. The manipulated variable $\Delta\hat{\omega}_g$ is received by fourth logic circuit 412. The fourth logic circuit 412 further receives a central value $\Omega_n$. In an example, the central value $\Omega_n=2\pi 50$ rad/s for a nominal angular grid frequency (50 Hz grid). As a result, the estimated variable $\hat{\omega}_g$ is obtained, where $\hat{\omega}_g=\Omega_n+\Delta\hat{\omega}_g$, until it matches the real one $\hat{\omega}_g$.

In an implementation, the APCA 400 corresponds to a power system, which includes two mega volt-ampere (MVA) synchronous generator units working with a classical primary and secondary control. Moreover, consumption is implemented by two 2MW resistors, and Load step responses are forced when resistors are connected/disconnected. In addition, the controller 106 of the APCA 400 is configured to control power and current injections to provide frequency control services. The controller 106 is tuned to have a closed-loop time constant of around 25 ms. This tuning key procedure is chosen in such a way that the RCSRF block 206 is much slower than the controller 106 or the current control and pulse width modulation block 204. In an example, the RCSRF block 206 is much slower than the controller 106 with a time constant value shorter than 1 ms.

Figure 5A:
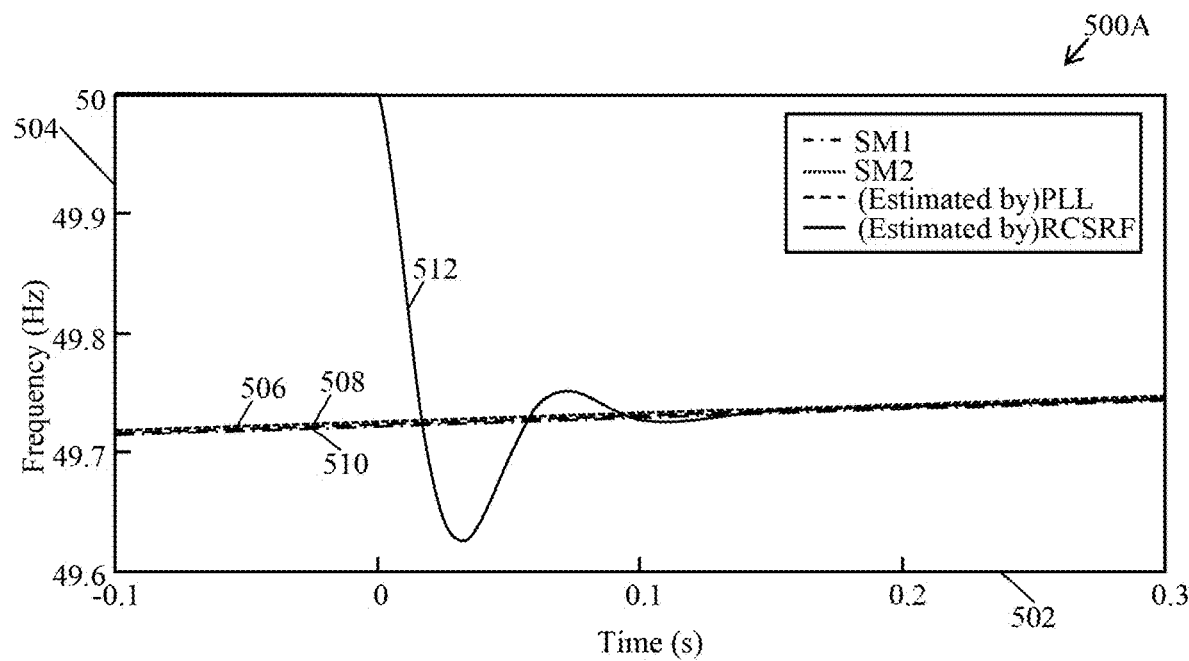
FIG. 5A is a graphical representation that illustrates a relationship between time and frequency for activation of reframing current synchronous reference frame (RCSRF) block, in accordance with an embodiment of the present disclosure.

FIG. 5A is a graphical representation that illustrates a relationship between time and frequency for activation of RCSRF block, in accordance with an embodiment of the present disclosure. FIG. 5A is described in conjunction with elements from FIGS. 1, 2, 3, and 4. With reference to FIG. 5A, there is shown a graphical representation 500A that illustrates the relationship between time and frequency for activation of RCSRF block 206. The graphical representation 500A includes X-axis 502, and Y-axis 504.

The graphical representation 500A represents time on the X-axis 502 and frequency on the Y-axis 504. In the graphical representation 500A, lines 506, 508, 510, and 512 illustrate frequency estimation. In particular, the line 506 illustrates frequency estimation value given by a synchronous machine (SM1), the line 508 illustrates frequency estimation value given by another synchronous machine (SM2). Similarly, the line 510 illustrates frequency estimation value given by a phase-locked loop (PLL), and the line 512 illustrates frequency estimation value given by the RCSRF block 206. In an example, settling time is around 100 milliseconds (ms) which roughly corresponds to the 25 ms time constant predicted in the design. The line 512 further illustrates that the APCA 102 is initially started with no load, and suddenly a 2MW load is connected. When the controller 106 (or an inverter control) detects an active current consumption of higher than its 5% nominal value, then the RCSRF block 206 is activated. In an example, the PIFC block 210 is attached to the RCSRF block 206, and the PIFC block 210 is configured to use a linear droop relation, for which the +−1 Hz corresponds to the ±400MW compensation power.

Figure 5B:
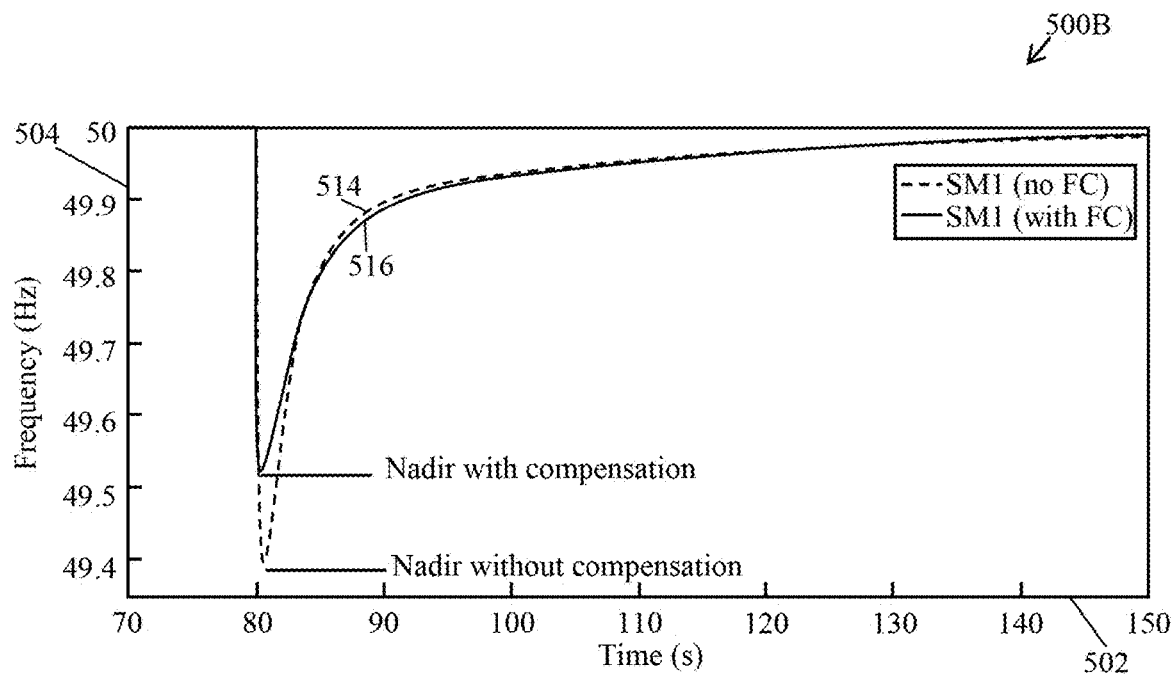
FIG. 5B is a graphical representation that illustrates performances of frequency control by a power injection for frequency control (PIFC) block, in accordance with an embodiment of the present disclosure.

FIG. 5B is a graphical representation that illustrates a performances of frequency control by a PIFC block, in accordance with an embodiment of the present disclosure. FIG. 5B is described in conjunction with elements from FIGS. 1, 2, 3, 4, and 5A. With reference to FIG. 5B, there is shown a graphical representation 500B that illustrates the relationship between time and of frequency for performances of frequency control by the PIFC block 210. The graphical representation 500B includes the X-axis 502, and the Y-axis 504. In particular, the graphical representation 500B shows simulated results when the frequency control is enabled using the frequency estimation as input of the PIFC block 210.

The graphical representation 500B represents time on the X-axis 502 and frequency on the Y-axis 504. In the graphical representation 500B, lines 514, and 516 illustrate performances of frequency control of the PIFC block 210. In particular, the line 514 illustrates frequency estimation value given by the synchronous machines (SM1) without frequency control, and the line 516 illustrates frequency estimation value given by the other synchronous machines (SM2) with frequency control. In an implementation, the frequency control is enabled using the frequency estimation as input of the PIFC block 210. In an example, the electric grid 104 (or a power grid) is working with a 2MW load, and suddenly, at a value of 80 seconds(s) a second 2MW load is connected creating a frequency shift. The PIFC block 210 uses a linear droop relation, for which the ±1 Hz corresponds to the +400MW compensation power. The performances with and without compensation are shown in FIG. 5B, where reduction of nadir (i.e., minimum frequency peak) and rate of change of frequency (ROCOF) is shown.

Figure 5C:
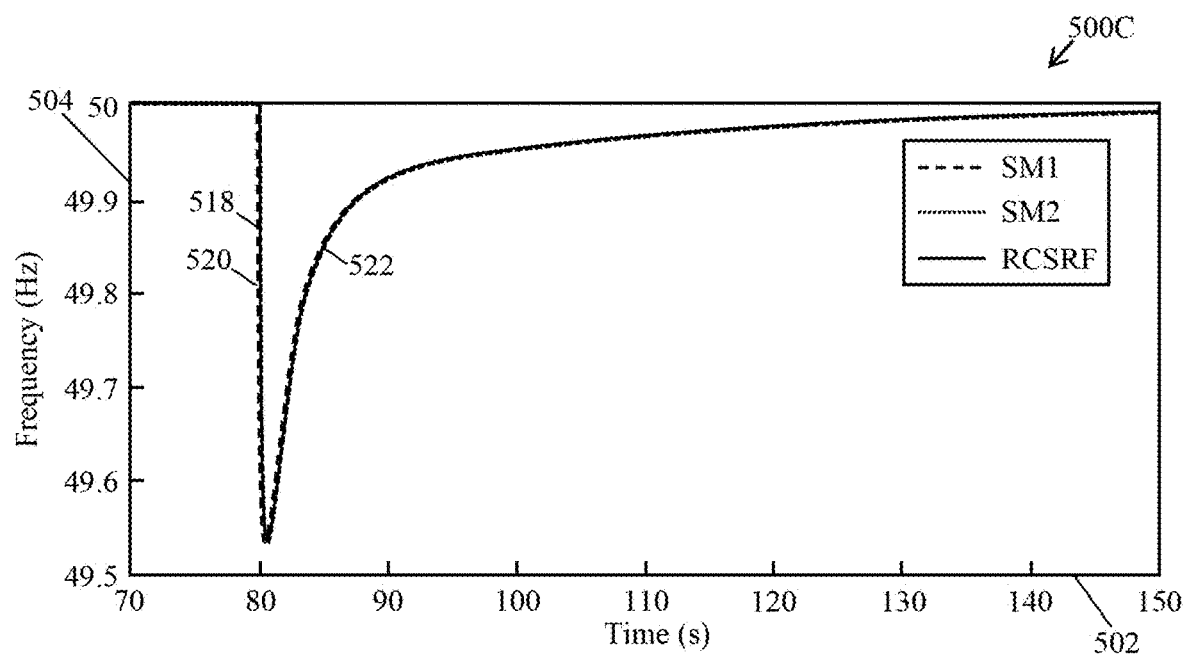
FIG. 5C is a graphical representation that illustrates frequency measurements, in accordance with an embodiment of the present disclosure.

FIG. 5C is a graphical representation that illustrates frequency measurements, in accordance with an embodiment of the present disclosure. FIG. 5C is described in conjunction with elements from FIGS. 1, 2, 3, 4, 5A, and 5B. With reference to FIG. 5C, there is shown a graphical representation 500C that illustrates the relationship between time and frequency. The graphical representation 500C includes the X-axis 502, and the Y-axis 504.

The graphical representation 500C represents time on the X-axis 502 and frequency on the Y-axis 504. In the graphical representation 500C, lines 518, and 520 illustrate frequency measurements of the two synchronous machines, and the line 522 illustrates frequency measurements by the RCSRF block 206. It is clearly visible that the lines 518, 520, and 522 overlaps, and provide similar values in measured values of frequency.

Figure 5D:
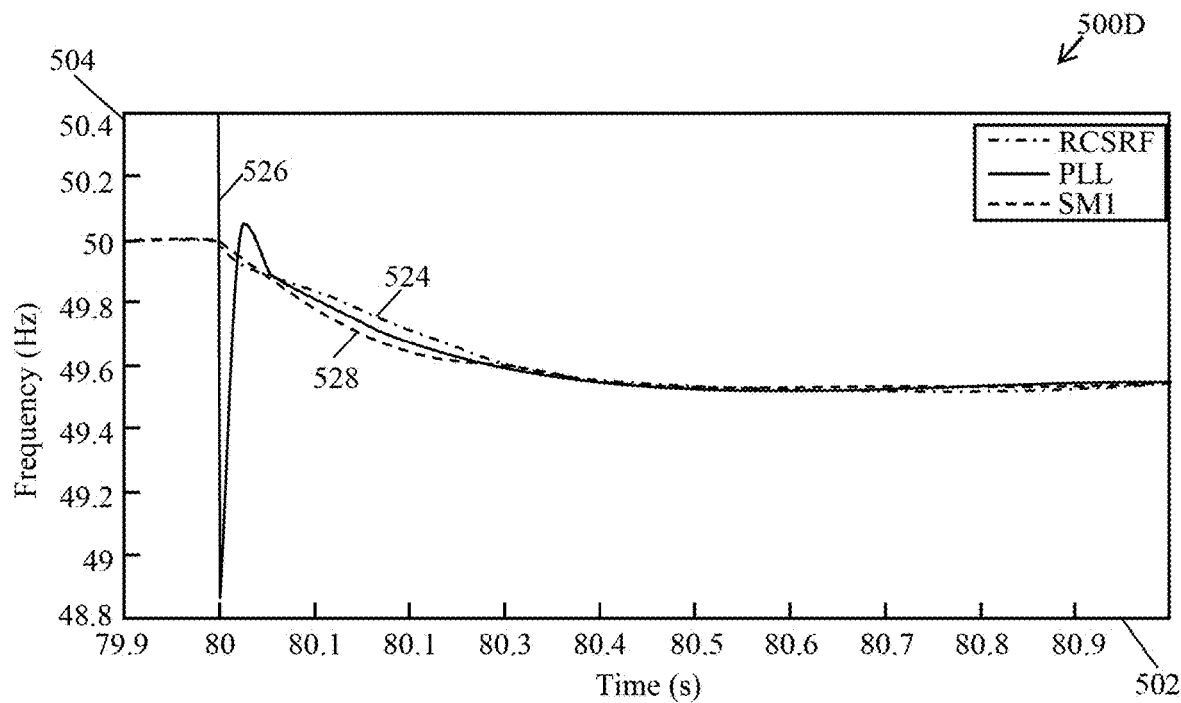
FIG. 5D is a graphical representation that illustrates a comparative analysis of simulated values of frequency measurements, in accordance with an embodiment of the present disclosure.

FIG. 5D is a graphical representation that illustrates a comparative analysis of simulated values of frequency measurements, in accordance with an embodiment of the present disclosure. FIG. 5D is described in conjunction with elements from FIGS. 1, 2, 3, 4, 5A, 5B and 5C. With reference to FIG. 5D, there is shown a graphical representation 500D that illustrates the relationship between time and frequency for comparative analysis of simulated values of frequency. The graphical representation 500D includes the X-axis 502, and the Y-axis 504, and the time scale have changed to see the instants after the event.

The graphical representation 500D represents time on the X-axis 502 and frequency on the Y-axis 504. In the graphical representation 500D, line 524 illustrate frequency estimation values obtained from the RCSRF block 206, line 526 illustrate frequency estimation values obtained from the PLL, and line 528 illustrate frequency estimation values obtained from the synchronous machine. In an example, the PLL is measuring frequency of the voltage at $v_c(t)$. From the graphical representation 500C, it is clearly visible that the PLL is not so reliable, since it uses as input a weak variable, instead of a stiff one, and the PLL underperforms worse as the power step grows. On the contrary, the RCSRF block 206 well and smoothly follows that synchronous machine waveform.

Figure 6:
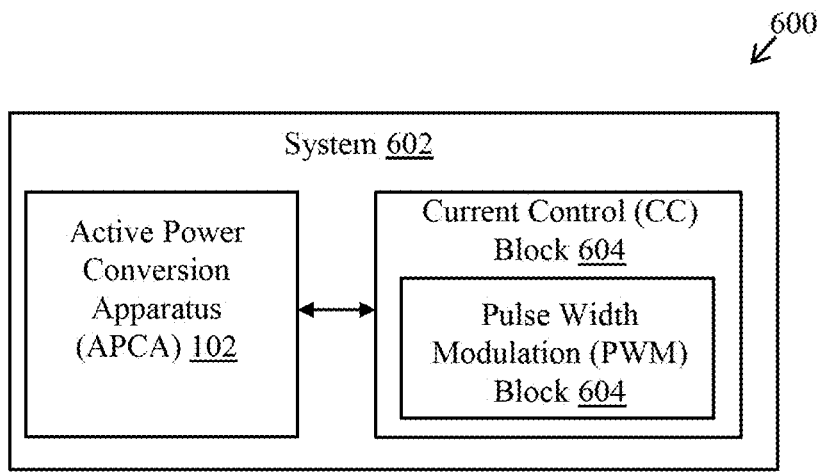
FIG. 6 is a block diagram that illustrates a system that includes an APCA, in accordance with an embodiment of the present disclosure.

FIG. 6 is a block diagram that illustrates a system that includes an APCA, in accordance with an embodiment of the present disclosure. FIG. 6 is described in conjunction with elements from FIGS. 1, 2, 3, 4, 5A, 5B, 5C and 5D. With reference to FIG. 6, there is shown a block diagram 600 that illustrates a system 602 that includes a CC block 604, a PWM block 606, and the APCA 102.

The system 602 may correspond to a power system. The current control block 604, and the pulse width modulation block 606 collectively refer to the current control and pulse width modulation block 204 of FIG. 2.

There is provided the system 602 that includes the APCA 102 and the current control block 604. The current control block 604 includes the pulse width modulation block 606 and the current control block 116 is configured to set references for the PWM block 606 as a function of current references, and AC currents measurements, and the phase-angle obtained by integration of the estimated frequency. The system 602 achieves all the advantages and technical effects of the APCA 102.

Figure 7:
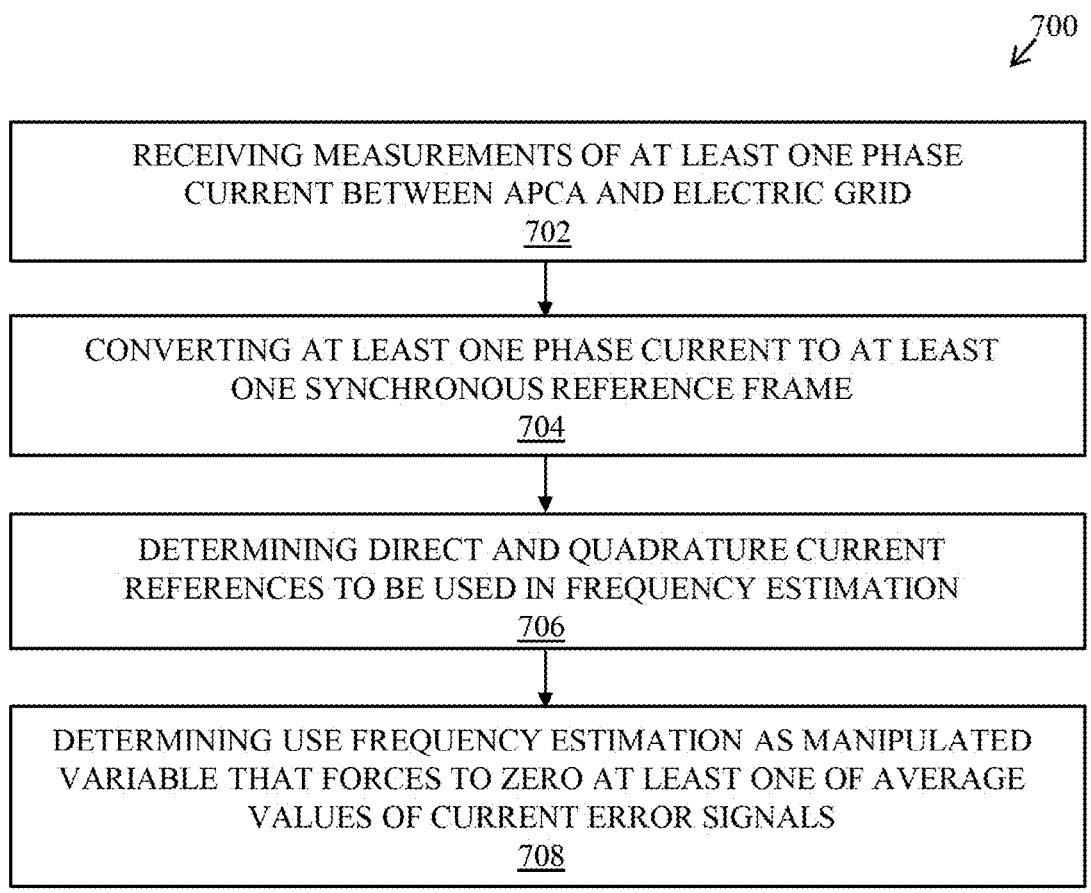
FIG. 7 is a flow chart of a method for use in an APCA, in accordance with an embodiment of the present disclosure.

FIG. 7 is a flow chart of a method for use in an APCA, in accordance with an embodiment of the present disclosure. FIG. 6 is described in conjunction with elements from FIGS. 1, 2, 3, 4, 5A, 5B, 5C, 5D and 6. With reference to FIG. 7, there is shown a flow chart of a method 700 for use in the APCA 102 (or the APCA 200, or the APCA 300, or the APCA 400).

There is provided the method 700 for use in an APCA 102 configured to estimate the grid frequency estimation of an electric grid 104 connected to the APCA 102. The method 700 is used to provide grid-frequency control services. The frequency estimation is employed to adjust an amount of active power delivered to the electric grid 104 by the APCA 102.

At step 702, the method 700 comprises, receiving measurements of at least one phase current between the APCA 102 and the electric grid 104. For example, the method 700 includes, receiving measurements of the at least one phase current from actual ac currents [$i_a$ $i_b$ $i_c$], where [$i_a$ $i_b$ $i_c$] represents three-phase current values.

At step 704, the method 700 comprises, converting the at least one phase current to at least one synchronous reference frame. In an implementation, a RCSRF along with the control the current control block and the pulse width modulation block are used by the method 700 to convert the at least one phase current to the at least one synchronous reference frame.

At step 706, the method 700 comprises, determining direct and quadrature current references to be used in the frequency estimation. The direct and the quadrature current references are two linearly independent vectors in a plane (i.e., two fully decoupled variables).

At step 708, the method 700 comprises, determining the use of frequency estimation as a manipulated variable that forces to zero at least one of the average values of current error signals. In other words, the method 700 includes, using the direct and the quadrature current references for determining the grid frequency estimation of the electric grid 104. In an implementation, the grid frequency estimation is represented as $\hat{\omega}_g$. Moreover, the grid frequency estimation is determined from the manipulated variable that forces to zero at least one of the average values of current error signals, as previously described in FIG. 4.

In accordance with an embodiment, the method 700 further comprises determining the at least one synchronous reference frame based on the direct components. In other words, the at least one synchronous reference frame is determined based on the direct current references only (i.e., [$I^*_q$]).

In accordance with an embodiment, the method 700 further comprises determining the at least one synchronous reference frame based on the quadrature components. In other words, the at least one synchronous reference frame is determined based on the quadrature current references only (i.e., [$I^*_q$]).

In accordance with an embodiment, the method 700 further comprises determining the direct and/or quadrature current references based on current error signals which are determined by subtracting the measurements of at least one phase current from the direct and quadrature current references. In an implementation, at least one phase current (i.e., $i_a$ or $i_b$ or $i_c$) is subtracted from the direct and quadrature current references. In an implementation, the method 700 further includes, determining the direct current reference based on the current error signals. In another implementation, the method 700 further includes, determining the quadrature current reference based on the current error signals. In yet another implementation, the method 700 further includes, determining the direct and quadrature current reference based on the current error signals.

In accordance with an embodiment, the method 700 further comprises converting the at least one phase current to at least one synchronous reference frame based on a park transform driven by an angle obtained by integration of the grid frequency estimation. In an implementation, the method 700 includes, integrating the estimated grid frequency, such as through an integrator, whose output is resulted in the form the angle (e.g., $\hat{\theta}_g$). The angle is further used to drive the park transform. Therefore, the method 700 includes, using the park transform for converting the at least one phase current to the at least one synchronous reference frame, such as through RCSRF. The park transform is beneficial to rotate the at least one synchronous reference frame at the angle.

In accordance with an embodiment, the method 700 further comprises driving the active power injection from at least one available energy storage resource 108 to the electric grid 104 based on the grid frequency estimation. In an implementation, the grid frequency estimation is employed to drive a PIFC, such as the electric grid 104, and eventually provide the active power injection that goes in or out of the energy storage resource 108 to the electric grid 104.

In accordance with an embodiment, the APCA 102 further comprises the linear filter 112 configured to be applied to the first state variable 110A of the APCA 102 and the linear filter 114 configured to be applied to the output of the linear filter 112 and the second state variable 110B that represents the direct current measurement or reference. In an implementation, the linear filter 112 and the linear filter 114 works in a frequency domain, and the linear filter 114 can acts as the main controller (e.g., the controller 106). Moreover, the linear filter 114 that is applied to the output of the linear filter 112, and the second state variable 110B that represents the direct current measurement (or reference).

In accordance with an embodiment, the method 700 further comprises bounding the second state variable 110B to avoid division by zero problems. In other words, the second state variable 110B employed in the division can be bounded in a range of values that avoids zero, such as to avoid the division by zero problems.

In accordance with an embodiment, the relation between injected power from the energy storage resource 108 and estimated frequency is based on a linear function. In an implementation, the injected power from the energy storage resource 108 aims to mitigate deviations of the grid frequency estimation. Moreover, the method 700 includes, storing the relation between the injected power from the energy storage resource 108 and the estimated frequency based on the linear function, such as $\hat{\omega}_g(t)$ versus $p_{sr}(t)$ function. The method 700 further includes taking into account maximum frequency deviations and maximum available power to provide the service.

In accordance with an embodiment, the linear function is a droop function. In other words, the linear function, such as $\hat{\omega}_g(t)$ versus $p_{sr}(t)$ function between injected power from the energy storage resource 108 and estimated frequency is the droop function (or a linear droop function). In addition, once the basic functionality is defined, the method 700 further includes, determining the grid frequency estimation using the electric measurements available at the energy storage resource 108 (or inverter terminals).

The method 700 is used in the APCA 102 for estimating the grid frequency estimation of the electric grid 104 connected to the APCA 102. In other words, the method 700 provides frequency control services in the electric grid 104 (or power electronics unit) that is equipped with the energy storage resource 108. Beneficially, as compared to the conventional approach, the method 700 can be used for determining the grid frequency estimation as the manipulated variable that forces to zero at least one of the average values of current error signals.

The steps 702 to 708 are only illustrative, and other alternatives can also be provided where one or more steps are added, one or more steps are removed, or one or more steps are provided in a different sequence without departing from the scope of the claims herein Modifications to embodiments of the present disclosure described in the foregoing are possible without departing from the scope of the present disclosure as defined by the accompanying claims. Expressions such as "including". "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. An active power conversion apparatus (APCA) configured to estimate a grid frequency of an electric grid connected to the APCA, the APCA comprising:
a controller configured to:
receive measurements of at least one phase current between the APCA and the electric grid;
convert the at least one phase current to at least one synchronous reference frame;
determine direct and quadrature current references to be used in the grid frequency estimation;
determine a use frequency estimation as a manipulated variable that forces to zero at least one of average values of current error signals; and
bound a state variable of the APCA to avoid division by zero problems,
wherein the state variable represents a direct current measurement or reference.

2. The APCA of claim 1, wherein the controller is further configured to determine the at least one synchronous reference frame based on direct components.

3. The APCA of claim 1, wherein the controller is further configured to determine the at least one synchronous reference frame based on quadrature components.

4. The APCA of claim 1, wherein the controller is further configured to;
determine the direct and/or quadrature current references based on the current error signals which are determined by subtracting the measurements of at least one phase current from the direct and quadrature current references, after the measurements of the at least one phase have been converted to at least one synchronous reference frame.

5. The APCA of claim 1, wherein the controller is further configured to convert the at least one phase current to the at least one synchronous reference frame based on a Park transform driven by an angle obtained by integration of the grid frequency estimation output.

6. The APCA of claim 1, wherein the controller is further configured to drive active power injection from at least one available energy storage resource to the electric grid based on the grid frequency estimation.

7. The APCA of claim 1, wherein the state variable is a second state variable, wherein the APCA further comprises:
a first linear filter applied to a first state variable of the APCA; and
a second linear filter applied to an output of the first linear filter and the second state variable.

8. The APCA of claim 1, wherein a relation between injected power from an energy storage resource and estimated frequency is based on a linear function.

9. The APCA of claim 8, wherein the linear function is a droop function.

10. A system comprising an active power conversion apparatus (APCA) configured to estimate a grid frequency of an electric grid connected to the APCA, the APCA comprising:
a controller configured to:
receive measurements of at least one phase current between the APCA and the electric grid;
convert the at least one phase current to at least one synchronous reference frame;
determine direct and quadrature current references to be used in the grid frequency estimation;
determine a use frequency estimation as a manipulated variable that forces to zero at least one of an average values of current error signals; and
bound a state variable of the APCA to avoid division by zero problems,
wherein the state variable represents a direct current measurement or reference; and
a current control (CC) block comprising a pulse width modulation (PWM) block, and wherein the CC block is configured to set references for the PWM block as a function of current references, alternating current (AC) measurements, and a phase-angle obtained by integration of an estimated frequency.

11. A method for use in an active power conversion apparatus (APCA) configured to estimate a grid frequency of an electric grid connected to the APCA, the method comprising:
receiving measurements of at least one phase current between the APCA and the electric grid;
converting the at least one phase current to at least one synchronous reference frame;
determining direct and quadrature current references to be used in the grid frequency estimation; and
determining a use frequency estimation as a manipulated variable that forces to zero at least one of average values of current error signals; and bounding a second state variable of the APCA to avoid division by zero problems,
  wherein the state variable represents a direct current measurement or reference.

12. The method of claim 11, wherein the method further comprises determining the at least one synchronous reference frame based on direct components.

13. The method of claim 11, wherein the method further comprises determining the at least one synchronous reference frame based on quadrature components.

14. The method of claim 11, wherein the method further comprises:
  determining the direct and/or quadrature current references based on the current error signals which are determined by subtracting the measurements of at least one phase current from the direct and quadrature current references, after the measurements of the at least one phase have been converted to at least one synchronous reference frame.

15. The method of claim 11, wherein the method further comprises converting the at least one phase current to the at least one synchronous reference frame based on a Park transform driven by an angle obtained by integration of the grid frequency estimation output.

16. The method of claim 11, wherein the method further comprises driving active power injection from at least one available energy storage resource to the electric grid based on the grid frequency estimation.

17. The method of claim 11, wherein the state variable is a second state variable, and wherein the APCA further comprises:
  a first linear filter applied to a first state variable of the APCA; and
  a second linear filter applied to an output of the first linear filter and the second state variable.

18. The method of claim 11, wherein a relation between injected power from an energy storage resource and estimated frequency is based on a linear function.

19. The system of claim 10, wherein the controller is further configured to drive active power injection from at least one available energy storage resource to the electric grid based on the grid frequency estimation.

20. The system of claim 10, wherein the state variable is a second state variable, and wherein the APCA further comprises first and second linear filters,
  wherein the first linear filter is applied to a first state variable of the APCA, and
  wherein the second linear filter is applied to an output of the first linear filter and the second state variable.

* * * * *